US010228506B2

(12) United States Patent
Chung et al.

(10) Patent No.: US 10,228,506 B2
(45) Date of Patent: Mar. 12, 2019

(54) DIRECTIONAL BACKLIGHT, 3D IMAGE DISPLAY APPARATUS HAVING THE SAME, AND METHOD OF MANUFACTURING THE SAME

(71) Applicant: SAMSUNG ELECTRONICS CO., LTD., Suwon-si (KR)

(72) Inventors: Jaeseung Chung, Suwon-si (KR); Sunghoon Lee, Seoul (KR); Jihyun Bae, Seoul (KR); Joonyong Park, Suwon-si (KR); Hoon Song, Yongin-si (KR); Hongseok Lee, Seongnam-si (KR); Dongouk Kim, Pyeongtaek-si (KR); Hyunjoon Kim, Seoul (KR); Bongsu Shin, Seoul (KR); Dongsik Shim, Hwaseong-si (KR); Seogwoo Hong, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 279 days.

(21) Appl. No.: 15/171,523

(22) Filed: Jun. 2, 2016

(65) Prior Publication Data
US 2017/0176669 A1 Jun. 22, 2017

(30) Foreign Application Priority Data

Dec. 18, 2015 (KR) ........................ 10-2015-0181857

(51) Int. Cl.
*F21V 8/00* (2006.01)
*G02B 5/18* (2006.01)
*G02B 27/22* (2018.01)

(52) U.S. Cl.
CPC ......... *G02B 6/0061* (2013.01); *G02B 5/1819* (2013.01); *G02B 5/1842* (2013.01); *G02B 5/1857* (2013.01); *G02B 6/005* (2013.01); *G02B 6/0065* (2013.01); *G02B 6/0068* (2013.01); *G02B 27/2228* (2013.01)

(58) Field of Classification Search
CPC .. G02B 5/1819; G02B 5/1842; G02B 5/1857; G02B 6/005; G02B 6/0061; G02B 6/0065; G02B 6/0068; G02B 27/2228
See application file for complete search history.

(56) References Cited

U.S. PATENT DOCUMENTS

| 8,345,183 | B2 | 1/2013 | Bae et al. |
| 9,080,748 | B2 | 7/2015 | Sohn et al. |
| 9,128,226 | B2 * | 9/2015 | Fattal ................... G02B 6/0036 |
| 2013/0300986 | A1 | 11/2013 | Kang |
| 2014/0300947 | A1 | 10/2014 | Fattal et al. |
| 2014/0300960 | A1 | 10/2014 | Santori et al. |
| 2015/0036068 | A1 | 2/2015 | Fattal et al. |
| 2015/0138486 | A1 | 5/2015 | Lee |
| 2017/0168209 | A1 | 6/2017 | Shin et al. |

* cited by examiner

*Primary Examiner* — Stephen F Husar
(74) *Attorney, Agent, or Firm* — Sughrue Mion, PLLC

(57) ABSTRACT

A directional backlight and a 3D image display apparatus including the directional backlight are provided. The directional backlight includes a light guide plate guiding light emitted from a light source; a diffractive device configured to adjust the direction of light exiting the light guide plate; and an aperture adjusting layer including a plurality of apertures. The aperture adjusting layer may adjust the optical output efficiency of the diffractive device.

26 Claims, 13 Drawing Sheets

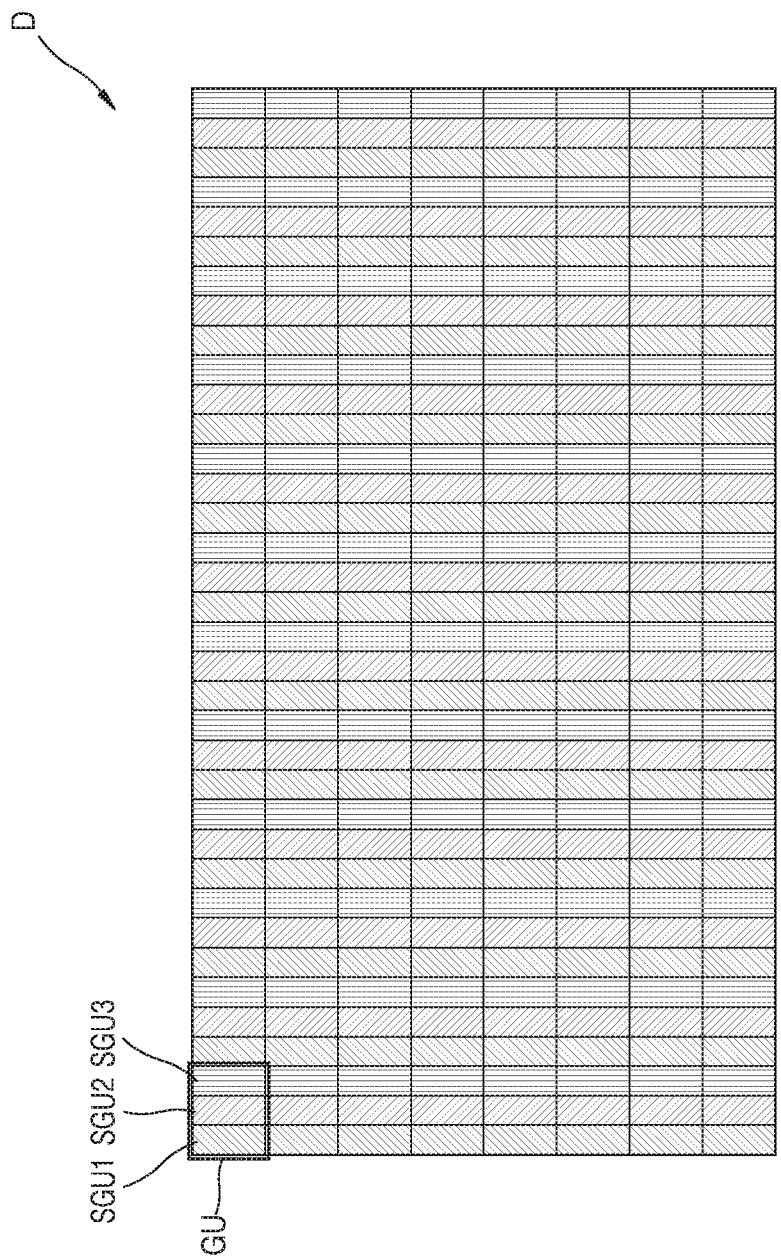

DIRECTIONAL BACKLIGHT, 3D IMAGE DISPLAY APPARATUS HAVING THE SAME, AND METHOD OF MANUFACTURING THE SAME

CROSS-REFERENCE TO RELATED APPLICATION

This application claims priority from Korean Patent Application No. 10-2015-0181857, filed on Dec. 18, 2015, in the Korean Intellectual Property Office, the disclosure of which is incorporated by reference herein in its entirety.

BACKGROUND

1. Field

The present disclosure relates to a directional backlight having improved optical uniformity, a 3D image display apparatus including the directional backlight, and a method of manufacturing the directional backlight.

2. Description of the Related Art

Along with the popularity of three-dimensional (3D) movies, much technology for 3D image display apparatuses has been researched. 3D image display apparatuses may display 3D images based on binocular parallax. Currently commercialized binocular-parallax 3D image display apparatuses are configured to display 3D images by providing left-eye and right-eye images having different viewpoints to the left and right eyes of viewers. Such 3D image display apparatuses may be classified into glasses-type 3D image display apparatuses requiring special glasses and non-glasses-type 3D image display apparatuses not requiring special glasses.

Examples of glasses-type 3D image display apparatuses include red-green glasses type 3D image display apparatuses used for movie theaters, and polarizing glasses or liquid crystal shutter glasses type 3D image display apparatuses for TVs. Non-glasses-type 3D image display apparatuses may be classified according to the structures thereof as barrier-type 3D image display apparatuses, lenticular-type 3D image display apparatuses, etc. In addition, non-glasses-type 3D image display apparatuses may be classified according to image forming methods as multi-view rendering 3D image display apparatuses, volumetric 3D image display apparatuses configured to contain all 3D space information and display the information in a 3D space using voxels, integral imaging 3D image display apparatuses capturing images at multiple angles using lenses shaped like compound eyes of insects (flies' eyes) and inversely displaying the images, holographic 3D image display apparatuses, 3D image display apparatuses using directional backlights, etc.

Directional backlights may form 3D images by adjusting the output direction of light using a grating. Light propagating in a light guide plate reaches an end of the light guide plate while being totally reflected. However, a relatively large amount of light is output through a propagation star region of the light guide plate, and the amount of light output from the light guide plate decreases in a direction away from the propagation start region of the light guide plate, thereby resulting in poor optical uniformity.

SUMMARY

It is an aspect to provide directional backlights having improved optical uniformity.

It is another aspect to provide three-dimensional (3D) image display apparatuses including directional backlights having improved optical uniformity.

Additional aspects will be set forth in part in the description which follows and, in part, will be apparent from the description, or may be learned by practice of the presented embodiments.

According to an aspect of an exemplary embodiment, there is provided directional backlight comprising a light source; a light guide plate comprising an entrance surface receiving light emitted from the light source, the light guide plate guiding the light emitted from the light source; a diffractive device comprising a plurality of grating units configured to adjust a direction of light exiting the light guide plate; and an aperture adjusting layer arranged on the diffractive device and comprising a plurality of apertures.

Each of the grating units may comprise a plurality of sub-grating units, wherein the sub-grating units are dependent on different wavelength bands of light, and the apertures of the aperture adjusting layer respectively correspond to the sub-grating units.

The apertures of the aperture adjusting layer may have different sizes so as to adjust aperture ratios of the corresponding sub-grating units.

The light source may comprise a light source configured to emit light of a plurality of colors in different directions, the aperture adjusting layer comprises aperture units corresponding to the grating units, and each of the aperture units comprises a plurality of sub-apertures transmitting the light of the colors.

Sizes of the sub-apertures may increase in the directions in which the light of the colors propagates.

Each of the grating units may comprise a plurality of sub-grating units, wherein the sub-grating units are dependent on different wavelength bands of light, the aperture adjusting layer may comprise aperture units corresponding to the grating units, and each of the aperture units may comprise a plurality of sub-apertures respectively corresponding to the sub-grating units.

The sub-apertures may have different size ratios in different aperture units.

The aperture adjusting layer may be divided into a plurality of sections, and the sub-apertures of the aperture units may have different size ratios in different sections.

According to another aspect of an exemplary embodiment, there is provided a directional backlight comprising a light source emitting light of a plurality of colors; a light guide plate comprising an entrance surface receiving the light emitted from the light source, the light guide plate guiding the light emitted from the light source; and a diffractive device comprising a plurality of grating units configured to adjust a direction of the light of the colors when the light exits the light guide plate, wherein each of the grating units comprises a plurality of sub-grating units corresponding to the light of the colors, and the sub-grating units have different refractive indexes such that output efficiency of the light of the colors increases in a direction away from the entrance surface of the light guide plate.

The diffractive device may be divided into a plurality of sections, and refractive indexes of sub-grating units of grating units included in a section relatively distant from the entrance surface of the light guide plate may be greater than refractive indexes of sub-grating units of grating units included in a section relatively close to the entrance surface of the light guide plate.

According to another aspect of an exemplary embodiment, there is provided a three-dimensional (3D) image display apparatus comprising a directional backlight; and a display panel forming images using light output from the directional backlight, wherein the directional backlight comprises a light source; a light guide plate comprising an entrance surface receiving light emitted from the light source, the light guide plate guiding the light emitted from the light source; a diffractive device comprising a plurality of grating units configured to adjust a direction of light exiting the light guide plate; and an aperture adjusting layer arranged on the diffractive device and comprising a plurality of apertures.

According to another aspect of an exemplary embodiment, there is provided a method of manufacturing a directional backlight, the method comprising forming grating units, each grating unit comprising a plurality of sub-grating units on a substrate, the sub-grating units comprising different diffraction patterns; preparing a mask comprising an aperture array corresponding to the sub-grating units; and etching the sub-grating units formed on the substrate using the mask such that the sub-grating units have different sizes.

The mask may comprise mask aperture units corresponding to the grating units, and the mask aperture units may comprise mask sub-apertures respectively corresponding to the sub-grating units.

The diffraction patterns may have nano-sizes, and the aperture array may have a micro-size.

The method may further comprise attaching a light guide plate to the substrate.

According to another aspect of an exemplary embodiment, there is provided a method of manufacturing a directional backlight, the method comprising printing a first material pattern having a first refractive index on a substrate by an inkjet printing method; printing a second material pattern having a second refractive index on the substrate by an inkjet printing method; and forming diffraction patterns on the first and second material patterns by a nanoimprinting method.

The method may further comprise printing a third material pattern having a third refractive index on the substrate by an inkjet printing method.

The method may further comprise attaching a light guide plate to the substrate.

The first and second material patterns may be configured to adjust output efficiency of light guided via the light guide plate.

The first and second material patterns may be configured such that output efficiency of light guided via the light guide plate increases in a direction away from an entrance surface of the light guide plate.

The first and second material patterns may comprise a plurality of grating units, and each of the grating units may comprise a plurality of sub-grating units selectively diffracting light of different colors.

According to another aspect of an exemplary embodiment, there is provided a directional backlight comprising a first light source emitting light in a first direction; a second light source emitting light in a second direction; a light guide plate comprising a first entrance surface receiving light emitted from the first light source and a second entrance surface receiving light emitted from the second light source; and a diffractive device provided on a surface of the light guide plate that is orthogonal to the first entrance surface and the second entrance surface, the diffractive device comprising a plurality of grating units configured to adjust a direction of light exiting the light guide plate, wherein the grating units are configured such that a grating unit relatively far away from the first entrance surface emits more light from the first light source than a grating unit relatively closer to the first entrance surface, and such that a grating unit relatively far away from the second entrance surface emits more light from the second light source than a grating unit relatively closer to the second entrance surface.

Each grating unit may comprise a plurality of sub-grating units, one sub-grating unit of the sub-grating units for light from the first light source, and another sub-grating unit of the sub-grating units for light from the second light source.

The directional backlight may further comprise an aperture adjusting layer arranged on the diffractive device and comprising a plurality of apertures.

The directional backlight may further comprise an aperture adjusting layer arranged on the diffractive device and comprising a plurality of apertures, the apertures respectively corresponding to the sub-grating units.

Sizes of a portion of the apertures may gradually increase as a distance from the first entrance surface increases, and sizes of a portion of the apertures may gradually increase as a distance from the second entrance surface increases.

BRIEF DESCRIPTION OF THE DRAWINGS

These and/or other aspects will become apparent and more readily appreciated from the following description of the exemplary embodiments, taken in conjunction with the accompanying drawings in which:

FIG. 3 is a view illustrating a diffractive device of the directional backlight according to an exemplary embodiment;

DETAILED DESCRIPTION

Figure 1:
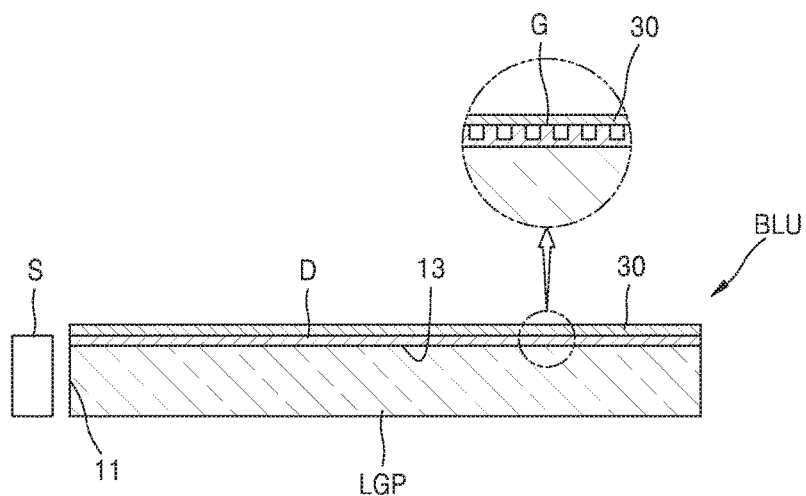
FIG. 1 is a view schematically illustrating a directional backlight according to an exemplary embodiment.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain various aspects thereof. As used herein, the term "and/or" includes any and all combinations of one or more of the associated listed items. Expressions such as "at least one of," when preceding a list of elements, modify the entire list of elements and do not modify the individual elements of the list.

Hereinafter, a directional backlight, a (three-dimensional) 3D image display apparatus including the directional backlight, and a method of manufacturing the directional backlight will be described according to exemplary embodiments with reference to the accompanying drawings.

In the drawings, like reference numbers refer to like elements, and the size of each element may be exaggerated for clarity of illustration. It will be understood that although the terms "first", "second", etc. may be used herein to describe various components, these components should not be limited by these terms. These terms are only used to distinguish one element from another.

As used herein, the singular forms "a," "an" and "the" are intended to include the plural forms as well, unless the context clearly indicates otherwise. It will be further understood that the terms "comprises," "comprising," "includes," and/or "including used herein specify the presence of stated features or elements, but do not preclude the presence or addition of one or more other features or elements.

In the present disclosure, terms such as units or modules are used to denote a unit having at least one function or performing at least one operation and implemented with hardware, software, or a combination of hardware and software. In addition, expressions such as "A is provided on B" may be construed to mean that A is provided to B in a contact or non-contact manner.

FIG. 1 is a view schematically illustrating a directional backlight BLU according to an exemplary embodiment. The directional backlight BLU may include a light source S emitting light, a light guide plate LGP guiding light emitted from the light source S, a diffractive device D arranged on the light guide plate LGP, and an aperture adjusting layer 30 adjusting the aperture ratio of the diffractive device D.

For example, the light source S may be arranged along at least one lateral side of the light guide plate LGP. For example, the light source S may emit light having at least one wavelength band. For example, the light source S may include a light emitting diode (LED) or a laser diode (LD). However, the light source S is not limited thereto. For example, any light source may be used as the light source S as long as the light source is capable of emitting light having a plurality of wavelengths. A plurality of LEDs or LDs may be arranged along at least one lateral side of the light guide plate LGP. The light guide plate may include at least one entrance surface 11 receiving light emitted from the light source S, and an exit surface 13 through which light propagating in the light guide plate LGP is output. The light guide plate LGP may guide light coming from the light source S while totally reflecting the light and may output the light through the exit surface 13.

Figure 2A:
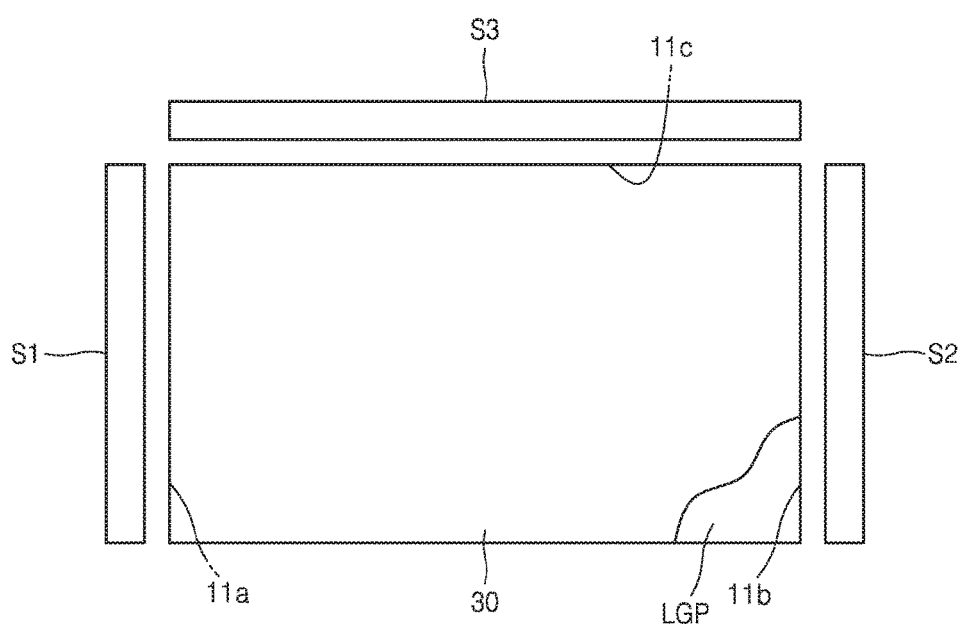
FIGS. 2A, 2B, and 2C are plan views illustrating directional backlights having different light source arrangements according to exemplary embodiments.
Figure 2B:
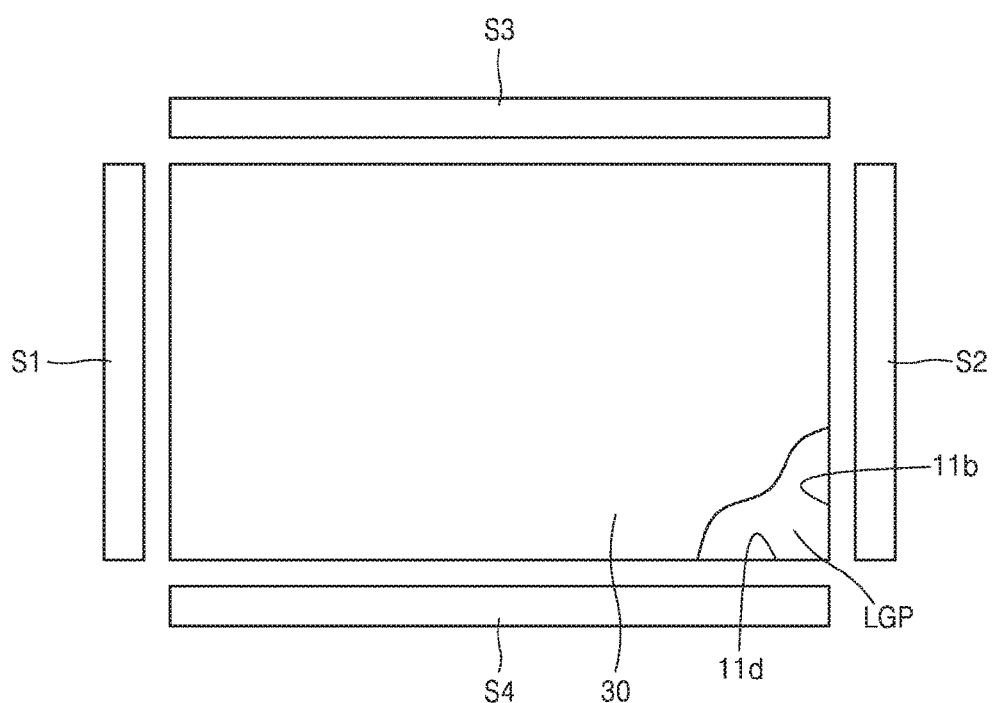
Figure 2C:
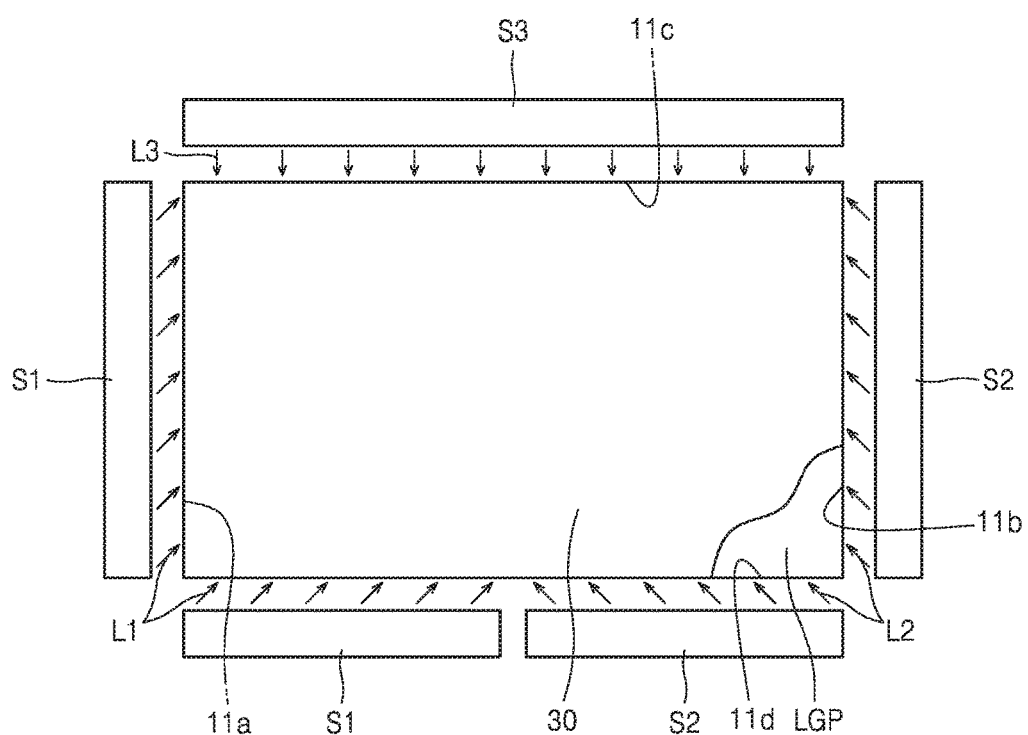

FIGS. 2A to 2C are plan views illustrating directional backlights BLU in which light sources S are differently arranged. Referring to FIG. 2A, for example, light sources S may include a first light source S1 emitting light having a first wavelength band, a second light source S2 emitting light having a second wavelength band, and a third light source S3 emitting light having a third wavelength band. For example, the first light source S1 may emit blue light, the second light source S2 may emit green light, and the third light source L3 may emit red light. For example, a light guide plate LGP may have a rectangular parallelepiped shape. The first light source S1 may be arranged along a first lateral side of the light guide plate LGP, the second light source S2 may be arranged along a second lateral side of the light guide plate LGP, and the third light source S3 may be arranged along a third lateral side of the light guide plate LGP. The light guide plate LGP may include a first entrance surface 11a receiving light emitted from the first light source S1, a second entrance surface 11b receiving light emitted from the second light source S2, and a third entrance surface 11c receiving light emitted from the third light source S3. However, the arrangement of the first to third light sources S1 to S3 is not limited thereto. That is, the first to third light sources S1 to S3 may be variously arranged. For example, the first to third light sources S1 to S3 may be alternately arranged along a lateral side of the light guide plate LGP. Light of different colors emitted from the first to third light sources S1 to S3 may be incident on the light guide plate LGP in different directions.

Referring to an example shown in FIG. 2B, first to fourth light sources S1 to S4 are respectively arranged in four lateral sides of a light guide plate LGP. For example, the first light source S1 may emit blue light, the second light source S2 may emit red light, and the third light source L3 may emit green light. The fourth light source S4 may emit light having a wavelength different from wavelengths of light emitted from the first to third light sources S1 to S3. For example, the fourth light source S4 may emit one of red light, blue light, and green light which is used more than the other colors. For example, the fourth light source S4 may emit red light. In this manner, the amount of light may be increased by increasing the number of light sources having lower optical efficiency than the other light sources. The light guide plate LGP may include a first entrance surface 11a receiving light emitted from the first light source S1, a second entrance surface 11b receiving light emitted from the second light source S2, a third entrance surface 11c receiving light emitted from the third light source S3, and a fourth entrance surface 11d receiving light emitted from the fourth light source S4.

Referring to FIG. 2C, a first light source S1 may be arranged along a first lateral side of a light guide plate LGP, a second light source S2 may be arranged along a second lateral side of the light guide plate LGP, a third light source S3 may be arranged along a third lateral side of the light guide plate LGP, and another first light source S1 and another second light source S2 may be arranged along a fourth lateral side of the light guide plate LGP. For example, the first light sources S1 may emit first light L1, the second light sources S2 may emit second light L2, and the third light source S3 may emit third light L3. The first light L1 and the second light L2 may be incident on the light guide plate LGP at an inclined angle, and the third light L3 may be incident on the light guide plate LGP in a direction perpendicular to a surface of the light guide plate LGP. For example, first light L1 emitted from one of the first light sources S1 arranged along a lateral side of the light guide plate LGP may be incident on the light guide plate LGP at the same angle at which first light L1 emitted from the other of the first light sources S1 arranged along another lateral side of the light guide plate LGP is incident on the light guide plate LGP. For example, second light L2 emitted from one of the second light sources S2 arranged along a lateral side of the light guide plate LGP may be incident on the light guide plate LGP at the same angle at which second light L2 emitted from the other of the second light sources S2 arranged in another lateral side of the light guide plate LGP is incident on the light guide plate LGP. Since the first light sources S1 and the second light sources S2 are arranged along different lateral sides of the light guide plate LGP as described above, the amount of first light L1 and the amount of second light L2 may be increased. Besides the above-described examples, the number and arrangement of the first to fourth light sources L1 to L4 may be variously adjusted or varied. For example, first light sources S1 and second light sources S2 may be alternately arranged along the fourth lateral side of the light guide plate LGP. The first to third light sources S1 to S3 may emit light toward the light guide plate LGP at different angles.

Referring to FIG. 1, the diffractive device D may include a grating G. The diffractive device D may include grating patterns (or diffraction patterns) so as to adjust the exit direction of light according to the angle of incidence of the light to the light guide plate LGP, and/or the wavelength of the light. For example, the angle of incidence of light to the light guide plate LGP may correspond to the exit direction of the light in which the light exits the light guide plate LGP. In addition, the diffractive device D may have selectivity with respect to wavelengths of light. In other words, the diffractive device D may include grating patterns interacting with light only having particular wavelength bands.

For example, the diffractive device D may include a plurality of grating pattern sets corresponding to at least one of the wavelength of the light and the direction of light incident on the diffractive device D from the light guide plate LGP. Light of particular wavelengths may interact with the grating G of the diffractive device D, and the light may exit the diffractive device D in particular directions according to the combination of factors such as the pitch of the grating G, the arrangement direction of the grating G, the refractive index of the grating G, the duty cycle of the grating G, or the angle of the grating G relative to the propagation direction of the light.

FIG. 3 is a schematic view illustrating the grating patterns of the diffractive device D. The diffractive device D may include a plurality of grating units GU. Each of the grating units GU may include a plurality of sub-grating units having characteristics dependent on the wavelength of light. The grating units GU may include grating patterns corresponding to pixels of a display panel (described later). The pixels may be units controlling the transmittance of light. The sub-grating units may include grating patterns corresponding to sub-pixels of the display panel. The sub-pixels may be units controlling the transmittance of light and wavelength selectivity. For example, the sub-pixels may be wavelength selection units of a color filter (described later).

For example, each of the grating units GU may include a first sub-grating unit SGU1, a second sub-grating unit SGU2, and a third sub-grating unit SGU3. For example, the first sub-grating unit SGU1 may interact with light of a first wavelength, the second sub-grating unit SGU2 may interact with light of a second wavelength, and the third sub-grating unit SGU3 may interact with light of a third wavelength.

Light may exit the diffractive device D in different directions according to the grating pattern sets of the diffractive device D. Light exiting in different directions may provide different views, and thus 3D images may be displayed. Here, the term "view" may refer to an image provided to one eye of a viewer. However, the inventive concept is not limited thereto. For example, an image realizing two or more views may be provided to one eye of a viewer. The diffractive device D may control the exit direction of light, and if different views are provided to a viewer according to the exit direction of light, 3D images may be displayed. For example, a plurality of views such as 36 views, 48 views, or 96 views may be provided depending on the number of the grating pattern sets.

Figure 4:
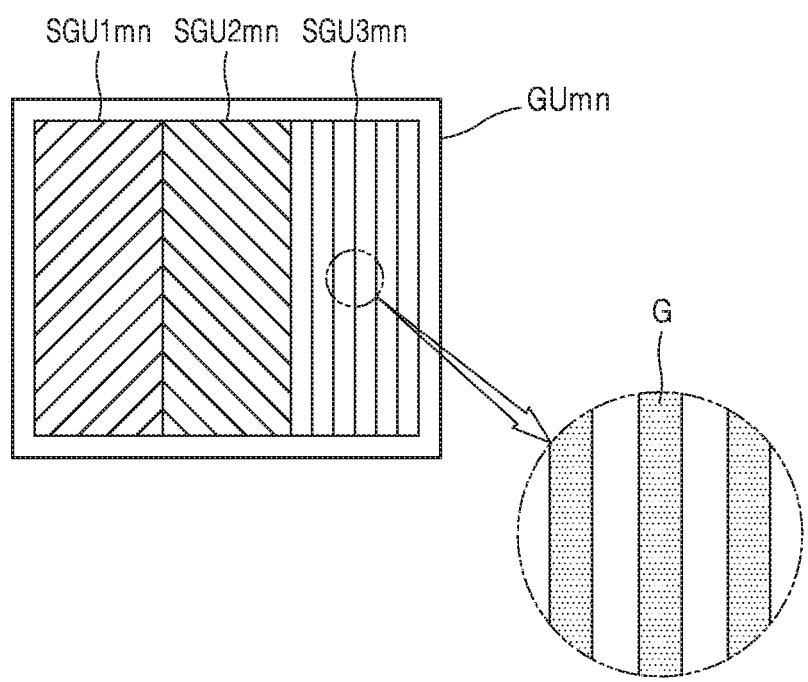
FIG. 4 is an enlarged view illustrating a grating unit of the diffractive device depicted in FIG. 3.

FIG. 4 is an enlarged view illustrating a grating unit GUmn of the diffractive device D shown in FIG. 3. For example, the diffractive device D may include a plurality of grating units GUmn arranged in a 2D matrix form. In GUmn, m and n may refer to a row and a column. For example, each of the grating units GUmn may include a first sub-grating unit SGU1*mn*, a second sub-grating unit SGU2*mn*, and a third sub-grating unit SGU3*mn*. The first sub-grating unit SGU1*mn*, the second sub-grating unit SGU2*mn*, and the third sub-grating unit SGU3*mn* may include different grating patterns. The first sub-grating unit SGU1*mn*, the second sub-grating unit SGU2*mn*, and the third sub-grating unit SGU3*mn* may have the same area.

Figure 5:
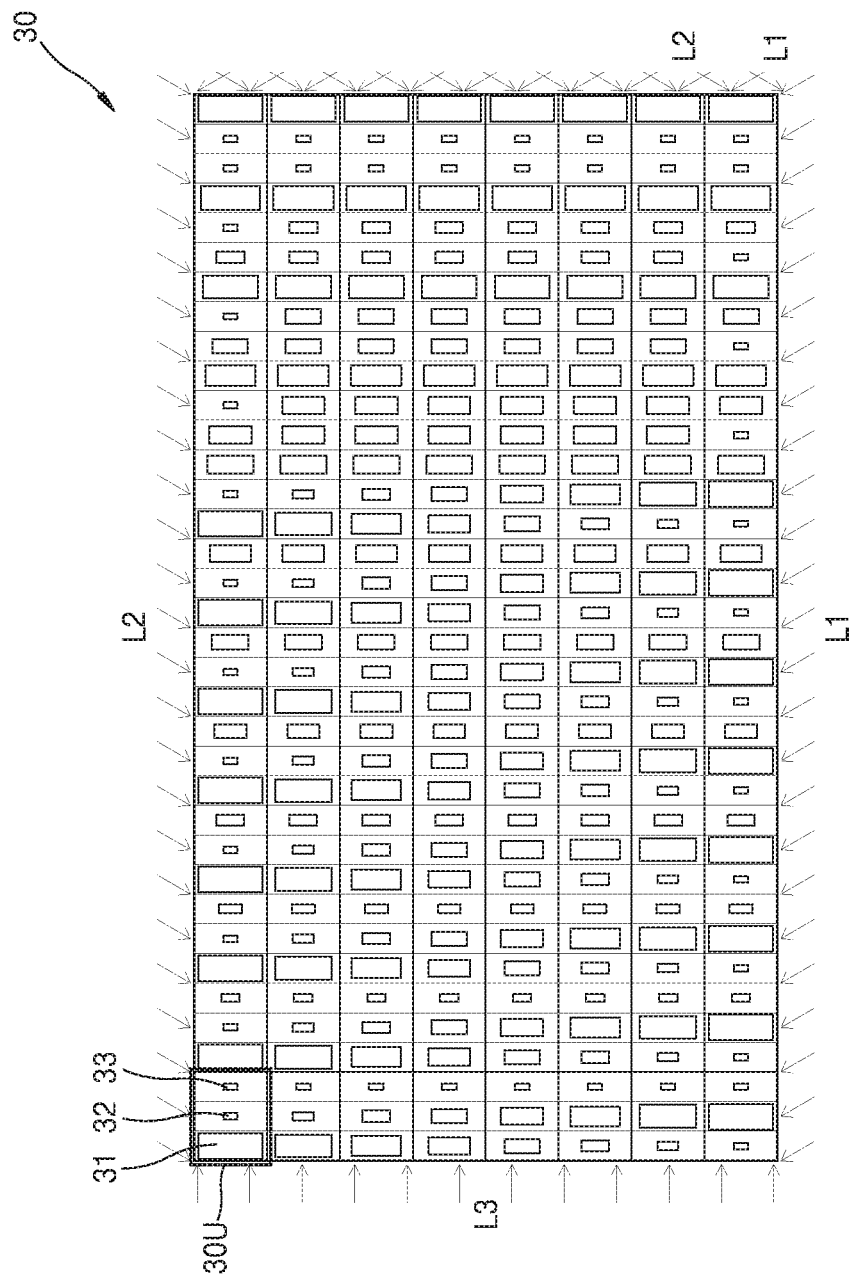
FIG. 5 is a view illustrating an aperture adjusting layer of the directional backlight according to an exemplary embodiment.

FIG. 5 is a plan view illustrating the aperture adjusting layer 30. For example, the aperture adjusting layer 30 may include an aperture array. The aperture adjusting layer 30 may include a plurality of aperture units 30U, and each of the aperture units 30U may include a plurality of sub-apertures. Note that in FIG. 5, an aperture unit 30U is shown by a dotted-dash line. For example, each of the aperture units 30U may include first to third apertures 31, 32, and 33. The aperture units 30U may correspond to the grating units GU of the diffractive device D.

Figure 6:
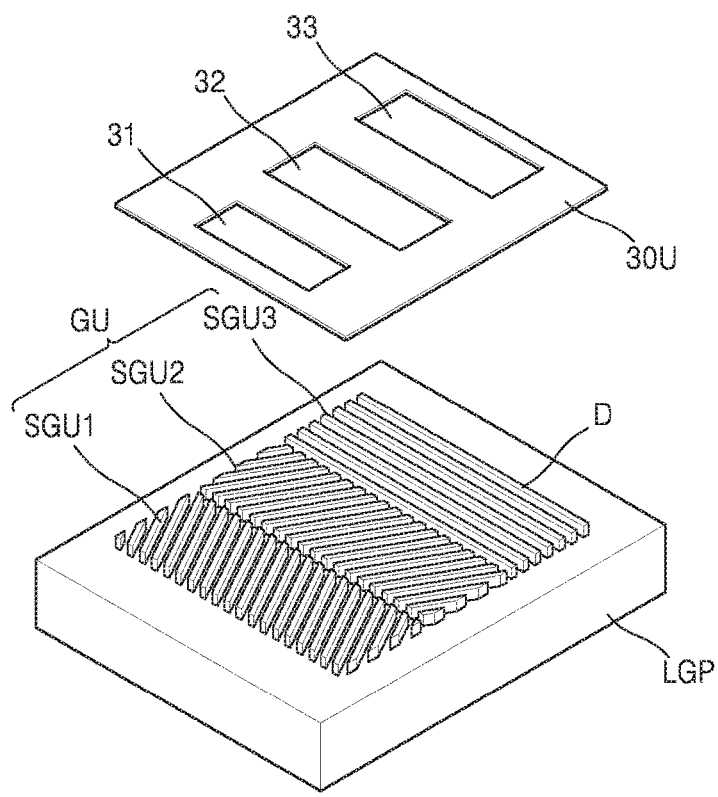
FIG. 6 is a partial exploded perspective view illustrating the diffractive device and the aperture adjusting layer of the directional backlight according to an exemplary embodiment.

FIG. 6 is a view illustrating a grating unit GU and an aperture unit 30U separated from each other for clarity of description. Referring to FIG. 6, first to third sub-grating units SGU1, SGU2, and SGU3 of the grating unit GU may correspond to first to third sub-apertures 31 to 33 of the aperture unit 30U, respectively. Therefore, the first to third sub-apertures 31 to 33 may control the aperture ratios of the first to third sub-grating units SGU1, SGU2, and SGU3. The term "aperture ratio" may refer to the ratio of the area of a sub-aperture to the area of a sub-grating unit. The amount of light passing through the first to third sub-grating units SGU1, SGU2, and SGU3 may be adjusted according to the sizes of the first to third sub-apertures 31 to 33.

As shown in FIG. 5, the sub-apertures of the aperture units 30U of the aperture adjusting layer 30 have different sizes, and the amounts of colors of light passing through the aperture adjusting layer 30 may be adjusted according to the sizes of the sub-apertures. For example, the first sub-apertures 31 may correspond to first light L1 having a first wavelength band, the second sub-apertures 32 may correspond to second light L2 having a second wavelength band, and the third sub-apertures 33 may correspond to third light L3 having a third wavelength band. The sizes of the sub-apertures may be adjusted in such a manner that a sub-aperture relatively distant from an entrance surface of the light guide plate LGP has a relatively large size so as to increase the output efficiency of light having a corresponding wavelength band when the light passes through the relatively distant sub-aperture. In another exemplary embodiment, the sizes of sub-apertures may be gradually increased along a propagation direction of light having a wavelength band corresponding to the sub-aperture. For example, the sizes of the first sub-apertures 31 may be gradually increased in a direction in which first light L1 propagates. The sizes of the second sub-apertures 32 may be gradually increased in a direction in which second light L2 propagates. The sizes of the third sub-apertures 33 may be gradually increased in a direction in which third light L3 propagates. The uniformity of light exiting the directional backlight BLU may be improved over the entire area of the directional backlight BLU by adjusting the sizes of the sub-apertures according to wavelength bands of light.

In the exemplary embodiment, the diffraction patterns of the diffractive device D may have nano-sizes, and the apertures of the aperture adjusting layer 30 may have micro-sizes. Therefore, the diffractive device D may be manufactured through a process such as a semiconductor manufacturing process, and the aperture adjusting layer 30 may be formed through a process such as a display manufacturing process. In the above, the semiconductor manufacturing process may refer to a fine process in which semiconductor wafers are processed on the scale of nanometers (nm), and the display manufacturing process may refer to a relatively large area process in which glass substrates are processed on the scale of micrometers (μm). That is, the aperture adjusting layer 30 may be formed in such a manner that the aperture adjusting layer 30 has a large area and the sub-apertures corresponding to sub-pixels have different sizes. For example, it may be difficult to form sub-grating units having different sizes through a semiconductor manufacturing process. Therefore, the sub-grating units of the diffractive device D may have the same size, and the sub-apertures of the aperture adjusting layer 30 may have different sizes. That is, the aperture units 30U may have different sub-aperture size ratios. Alternatively, the aperture adjusting layer 30 may be divided into a plurality of sections, the ratio of sub-aperture sizes of the aperture units 30U may be varied over the sections of the aperture adjusting layer 30.

Therefore, owing to the aperture adjusting layer 30 configured as described above, the uniformity of light exiting the directional backlight BLU may be improved over the entire area of the directional backlight BLU. It is difficult to manufacture sub-grating units of a diffractive device having different sizes. However, it is relatively easy to form sub-apertures of an aperture adjusting layer having different sizes. Therefore, according to the exemplary embodiment, the uniformity of light of a large-area backlight may be effectively improved.

Figure 7:
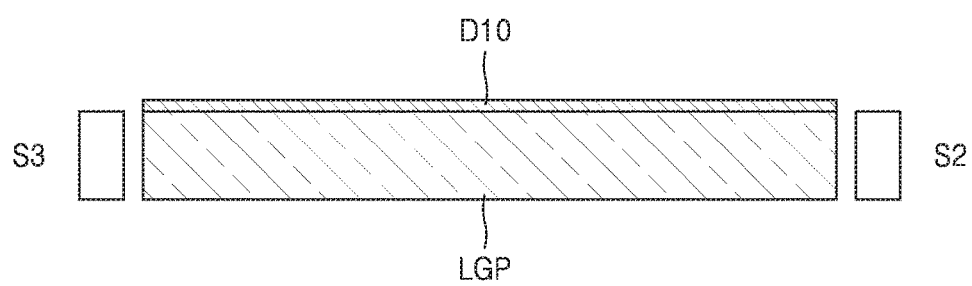
FIG. 7 is a cross-sectional view illustrating a directional backlight according to another exemplary embodiment.
Figure 8:
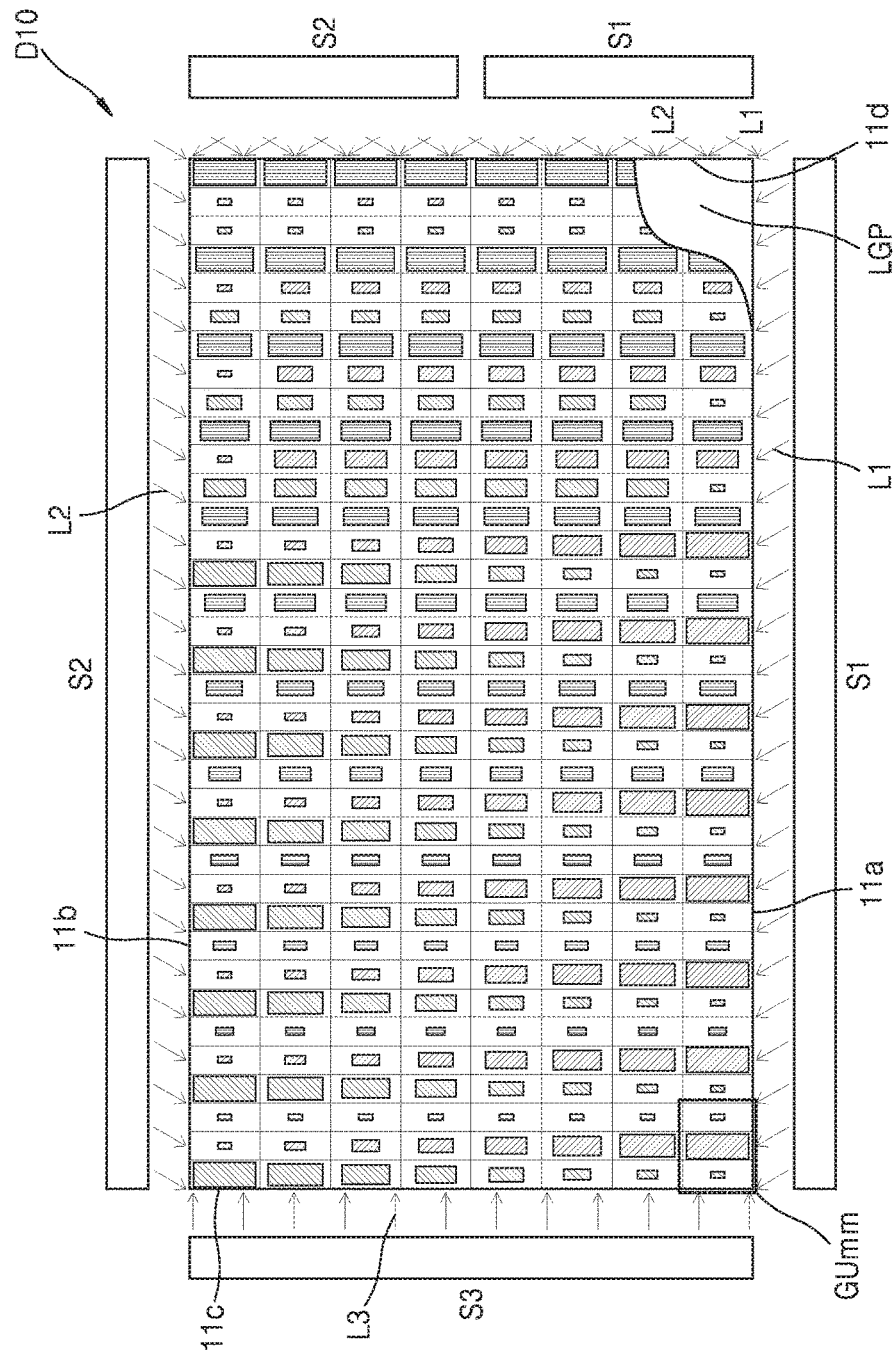
FIG. 8 is a plan view illustrating the directional backlight depicted in FIG. 7.

FIG. 7 is a cross-sectional view illustrating a directional backlight according to another exemplary embodiment, and FIG. 8 is a cutaway plan view illustrating the directional backlight of FIG. 7.

The directional backlight may include a light source, a light guide plate LGP guiding light emitted from the light source, and a diffractive device D10 including diffraction patterns to adjust the direction of light exiting the light guide plate LGP.

For example, the light source may include first light sources S1, second light sources S2, and a third light source S3 so as to emit light of different colors. For example, the first light sources S1 may emit first color light L1, the second light sources S2 may emit second color light L2, and the third light source S3 may emit third color light L3. The first color light L1, the second color light L2, and the third color light L3 may be incident on the light guide plate LGP in different directions. For example, the first color light L1 may include red light, the second color light L2 may include green light, and the third color light L3 may include blue light. The light guide plate LGP may include a first entrance surface 11a, a second entrance surface 11b, a third entrance surface 11c, and a fourth entrance surface 11d, so as to receive light through lateral sides thereof.

Figure 9:
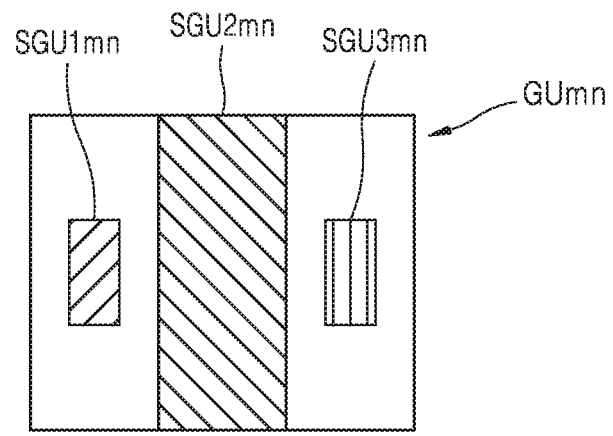
FIG. 9 is an enlarged view illustrating a grating unit of a diffractive device of the directional backlight depicted in FIG. 8.

The diffractive device D10 may include a plurality of grating units GUmn. Each of the grating units GUmn may include a plurality of sub-grating units corresponding to a plurality of colors of light. FIG. 9 is an enlarged view illustrating one of the grating units GUmn. For example, each of the grating units GUmn may include a first sub-grating unit SGU1mn corresponding to first color light L1, a second sub-grating unit SGU2mn, and a third sub-grating unit SGU3mn.

As shown in FIG. 8, the sub-grating units of the grating units GUmn of the diffractive device D10 may have different sizes, and the amounts of colors of light passing through the diffractive device D10 may be adjusted according to the sizes of the sub-grating units. For example, the first sub-grating units SGU1mn may interact with first color light L1, the second sub-grating units SGU2mn may interact with second color light L2, and the third sub-grating units SGU3mn may interact with third color light L3. The sizes of the sub-grating units may be adjusted in such a manner that a sub-grating unit relatively distant from an entrance surface of the light guide plate LGP has a relatively large size so as to increase the output efficiency of corresponding color light when the color light passes through the relatively distant sub-grating unit. In another exemplary embodiment, the sizes of sub-grating units may be gradually increased in a direction in which color light corresponding to the sub-grating units propagates. For example, the sizes of the first sub-grating units SGU1mn may be gradually increased in a direction in which first color light L1 propagates. The sizes of the second sub-grating units SGU2mn may be gradually increased in a direction in which second color light L2 propagates. The sizes of the third sub-grating units SGU3mn may be gradually increased in a direction in which third color light L3 propagates. The uniformity of light exiting the directional backlight may be improved over the entire area of the directional backlight by adjusting the sizes of the sub-grating units according to colors of light.

Figure 10:
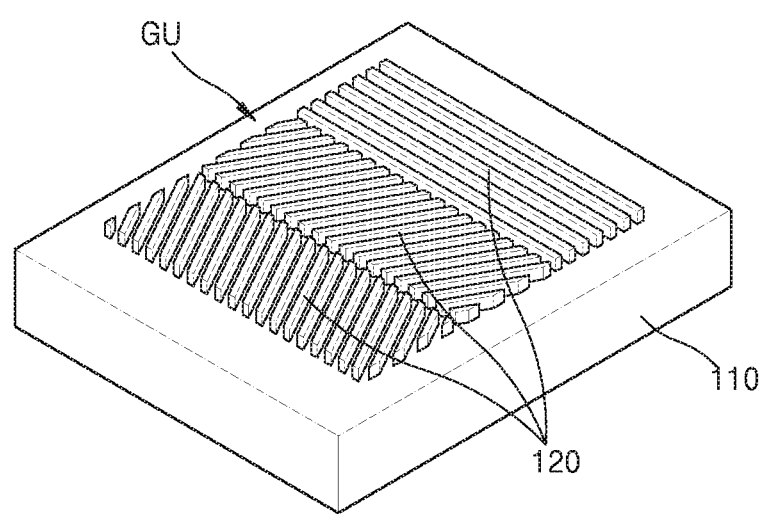
FIGS. 10 and 11 are views illustrating a method of manufacturing a directional backlight according to an exemplary embodiment.
Figure 11:
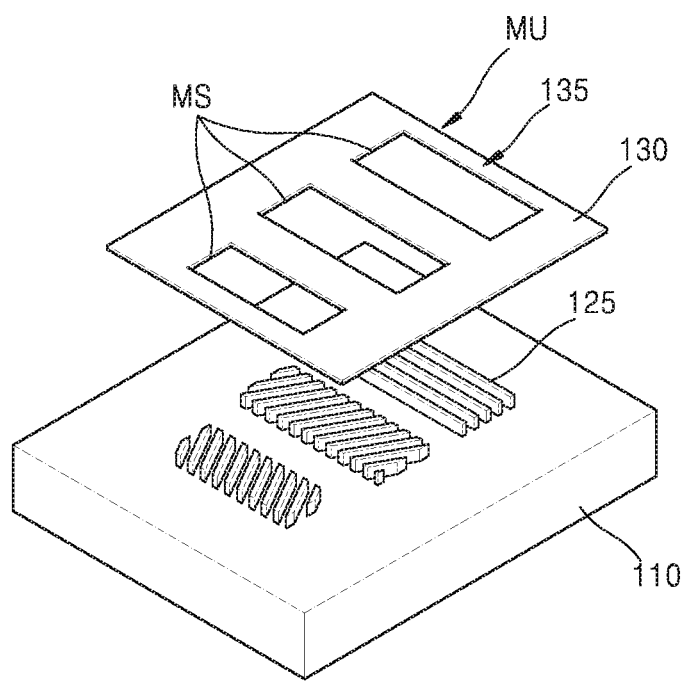
Figure 12:
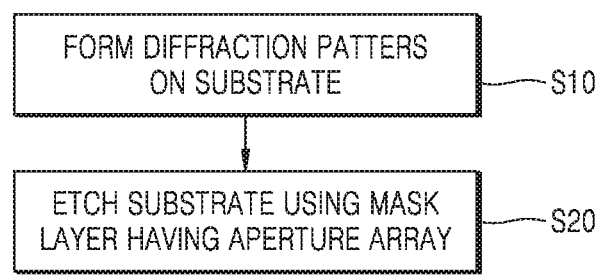
FIG. 12 is a flowchart illustrating the method of manufacturing a directional backlight according to the exemplary embodiment.

A method of manufacturing the directional backlight illustrated in FIG. 8 will now be described with reference to FIGS. 10, 11, and 12. In FIGS. 10 and 11, only one grating unit is illustrated for clarity of description. Referring to FIG. 12, a grating unit GU including a plurality of sub-grating units 120 having different diffraction patterns may be formed on a substrate 110 (S10). In this case, the sub-grating units 120 may have the same area. Referring to FIG. 11, a mask 130 including a plurality of apertures may be prepared. The mask 130 may include an aperture array 135 corresponding to the sub-grating units 120. The aperture array 135 may have a combination of various aperture areas.

For example, the mask 130 may include a mask aperture unit MU corresponding to the grating unit GU, and the mask aperture unit MU may include mask sub-apertures MS respectively corresponding to the sub-grating units 120. The sub-grating units 120 may be etched using the mask 130 to form sub-grating units 125 having different sizes (S20). In this manner, sub-grating units having various areas may be formed using a mask having an aperture array.

Figure 13:
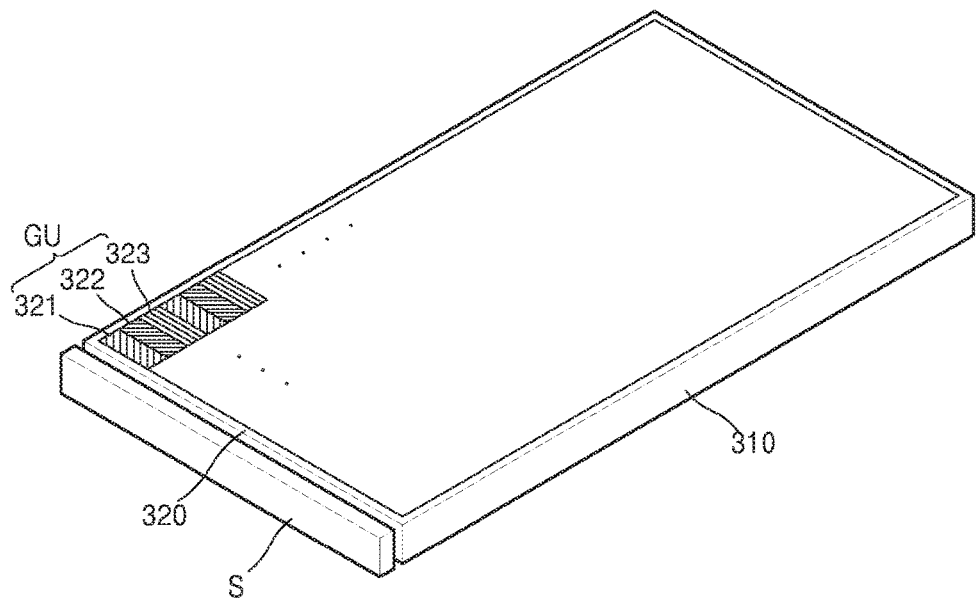
FIG. 13 is a perspective view schematically illustrating a directional backlight according to another exemplary embodiment.

FIG. 13 is a view schematically illustrating a directional backlight according to another exemplary embodiment. The directional backlight may include a light guide plate 310 and a diffractive device 320 on the light guide plate 310. A light source S capable of emitting light of a plurality of colors may be arranged along a lateral side of the light guide plate 310. In FIG. 13, the light source S is arranged along a lateral side of the light guide plate 310. However, light sources S may be variously arranged as described with reference to FIGS. 2A, 2B, and 2C. The diffractive device 320 may include a plurality of grating units GU. Each of the grating units GU may include a plurality of sub-grating units corresponding to a plurality of colors of light. For example, the plurality of sub-grating units of the grating unit GU shown in FIG. 13 may include first to third sub-grating units 321, 322, and 323.

The first to third sub-grating units 321 to 323 may have different refractive indexes such that the output efficiency of color light exiting the light guide plate 310 increases in a direction far away from an entrance surface of the light guide plate 310. In other words, the refractive indexes of the first to third sub-grating units 321 to 323 of the grating units GU may be variously adjusted.

Figure 14:
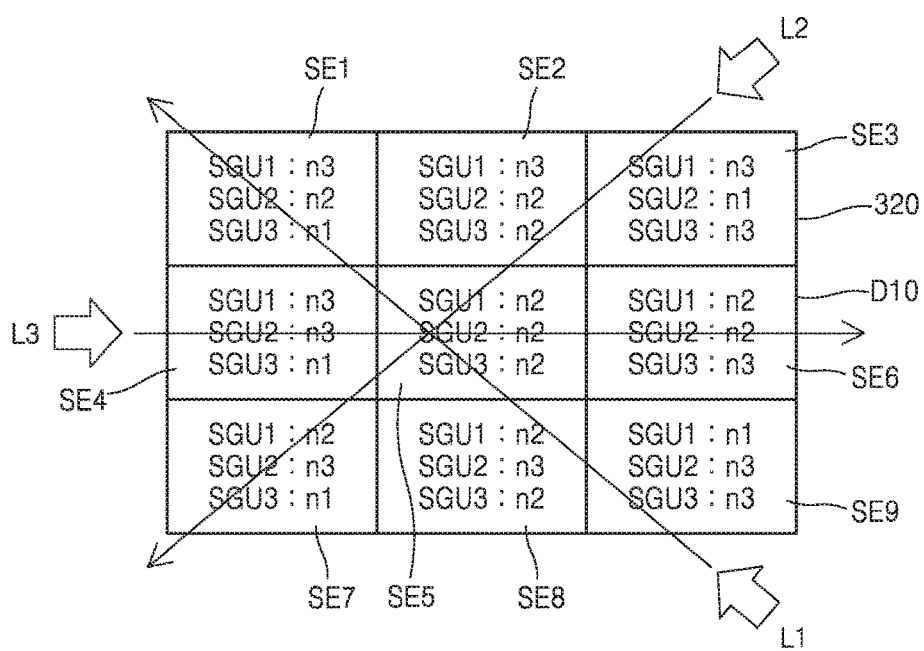
FIG. 14 is a schematic view illustrating refractive indexes of sub-grating units of the directional backlight depicted in FIG. 13.

FIG. 14 is a schematic view illustrating refractive indexes of sub-grating units of a directional backlight. For example, a diffractive device D10 may include a plurality of sections. For example, the diffractive device D10 may include first to ninth sections SE1, SE2, SE3, SE4, SE5, SE6, SE7, SE8, and SE9. The refractive indexes of the sub-grating units may be different in different sections. For example, n1 refers to a first refractive index, n2 refers to a second refractive index, and n3 refers to a third refractive index. In each grating unit of the first section SE1, a first sub-grating unit SGU1 may have the third refractive index n3, a second sub-grating unit SGU2 may have the second refractive index n2, and a third sub-grating unit SGU3 may have the first refractive index n1. In each grating unit of the second section SE2, a first sub-grating unit SGU1 may have the third refractive index n3, a second sub-grating unit SGU2 may have the second refractive index n2, and a third sub-grating unit SGU3 may have the second refractive index n2. In other sections, first to third sub-grating units SGU1 to SGU3 may have different refractive indexes as described above.

In each section, the refractive indexes of the first to third sub-grating units SGU1, SGU2, and SGU3 may be adjusted such that the output efficiency of corresponding color light may increase in a propagation direction of the color light. If the refractive index of a grating increases, the output efficiency of light passing through the grating may increase. For example, when $n1<n2<n3$, the refractive indexes of sub-grating units may be adjusted to be n1, n2, and n3 sequentially in a propagation direction of color light corresponding to the sub-grating units. For example, as shown in FIG. 14, in a propagation direction of first color light L1, the first sub-grating unit SGU1 of the ninth section SE9 may have the first refractive index n1, the first sub-grating unit SGU1 of the fifth section SE5 may have the second refractive index n2, and the first sub-grating unit SGU1 of the first section SE1 may have the third refractive index n3. For example, as shown in FIG. 14, in a propagation direction of third color light L3, the third sub-grating unit SGU3 of the fourth section SE4 may have the first refractive index n1, the third sub-grating unit SGU3 of the fifth section SE5 may have the second refractive index n2, and the third sub-grating unit SGU3 of the sixth section SE6 may have the third refractive index n3. In the above, three refractive indexes n1, n2, and n3 are mentioned. However, more refractive indexes may be arranged to form a gradient refractive index distribution as described above. As described above, if the refractive index of a sub-grating unit relatively close to a light source and the refractive index of a sub-grating unit relatively distant from the light source are adjusted relative to each other, the light uniformity of a backlight may be improved.

Figure 15:
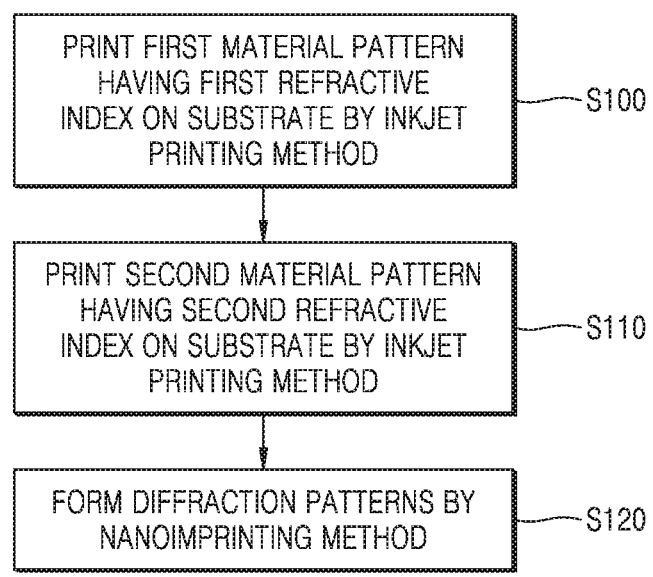
FIG. 15 is a flowchart illustrating a method of manufacturing a directional backlight according to another exemplary embodiment.

FIG. 15 is a flowchart illustrating a method of manufacturing the directional backlight shown in FIG. 13. Referring to FIG. 15, a first material pattern having a first refractive index may be printed on a substrate by an inkjet printing method (S100). A second material pattern having a second refractive index may be printed on the substrate by an inkjet printing method (S110). Inkjet printing methods are well-known in the related art, and thus descriptions thereof will not be provided here. In addition, additional material patterns having different refractive indexes may be formed by an inkjet printing method. For example, in the case of the directional backlight shown in FIG. 14, a third material pattern having a third refractive index may be further printed by an inkjet printing method. For example, referring to FIG. 14, the first material pattern may be a pattern of sub-grating units having the first refractive index n1, the second material pattern may be a pattern of sub-grating units having the second refractive index n2, and the third material pattern may be a pattern of sub-grating units having the third refractive index n3.

Next, diffraction patterns may be formed on each of the first to third material patterns by a nanoimprinting method (S120). If the nanoimprinting method is used, nano-size patterns may be printed over a large area. As described above, a diffractive device on which diffraction patterns having different refractive indexes are formed may be easily manufactured by an inkjet printing method and a nanoimprinting method.

Figure 16:
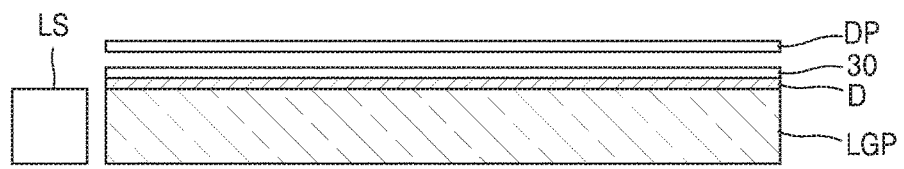
FIG. 16 is a view schematically illustrating a three-dimensional (3D) image display apparatus including a directional backlight according to an exemplary embodiment.

FIG. 16 is a view schematically illustrating a 3D image display apparatus according to an exemplary embodiment. The 3D image display apparatus may include a light source LS, a light guide plate LGP guiding light emitted from the light source LS, a diffractive device D provided on the light guide plate LGP, a aperture adjusting layer 30 including a plurality of apertures, and a display panel DP displaying images. The light source LS, the light guide plate LGP, the diffractive device D, and the aperture adjusting layer 30 are substantially the same as those illustrated with reference to FIGS. 1 to 6, and thus detailed descriptions thereof will not be presented here.

For example, the display panel DP may include a liquid crystal display. For example, the display panel DP may include a plurality of pixels arranged in a matrix form, and each of the pixels may include sub-pixels each corresponding to color light. For example, the 3D image display apparatus may display twenty views. Here, the term "view" may refer to an image provided to one eye of a viewer. However, the inventive concept is not limited thereto. For example, an image realizing two or more views may be provided to one eye of a viewer. For example, for the case of displaying twenty views, the diffractive device D may include grating pattern sets each having grating units corresponding to twenty views. For example, for the case of displaying ninety six views, the diffractive device D may include grating pattern sets each having grating units corresponding to ninety six views.

When light emitted from the light source LS passes through the diffractive device D in a direction toward the display panel DP, the diffractive device D may adjust the direction of the light according to at least one of the wavelength of the light and the angle of incidence of the light to the light guide plate LGP, and thus 3D images may be displayed. The aperture ratios of sub-grating units of the diffractive device D may be varied according to regions of the diffractive device D by using the aperture adjusting layer 30, so as to improve the uniformity of light exiting the diffractive device D.

Figure 17:
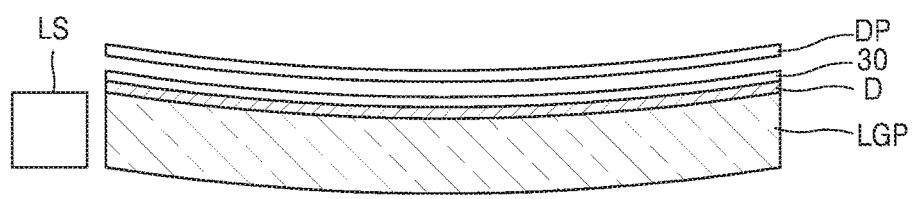
FIG. 17 is a view schematically illustrating a 3D image display apparatus including a directional backlight, according to another exemplary embodiment.

Referring to FIG. 17, a 3D image display apparatus having a curved shape may be manufactured. For example, a light guide plate LGP, a diffractive device D, a aperture adjusting layer 30, and a display panel DP having curved shapes may be manufactured so as to display images more naturally.

Figure 18:
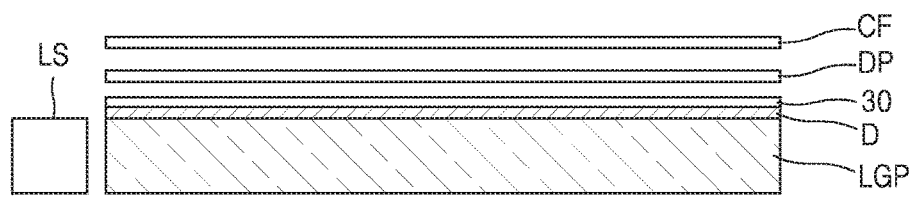
FIG. 18 is a view illustrating an example in which the 3D image display apparatus depicted in FIG. 16 further includes a color filter.

FIG. 18 illustrates a 3D image display apparatus further including a color filter CF compared to the 3D image display apparatus illustrated in FIG. 16. For example, the color filter CF may be arranged to face a light output surface of a display panel DP. 3D color images may be displayed by adjusting the output direction of light using a diffractive device D, expressing grayscales using the display panel DP, and expressing colors using the color filter CF.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A directional backlight comprising:
    a light source;
    a light guide plate comprising an entrance surface receiving light emitted from the light source, the light guide plate guiding the light emitted from the light source;
    a diffractive device comprising a plurality of grating units configured to adjust a direction of light exiting the light guide plate; and
    an aperture adjusting layer arranged on the diffractive device and comprising a plurality of apertures having different sizes.

2. The directional backlight of claim 1, wherein each of the grating units comprises a plurality of sub-grating units, wherein the sub-grating units are dependent on different wavelength bands of light, and the apertures of the aperture adjusting layer respectively correspond to the sub-grating units.

3. The directional backlight of claim 2, wherein the apertures of the aperture adjusting layer have different sizes so as to adjust aperture ratios of the corresponding sub-grating units.

4. The directional backlight of claim 1, wherein the light source comprises a light source configured to emit light of a plurality of colors in different directions, the aperture adjusting layer comprises aperture units corresponding to the grating units, and each of the aperture units comprises a plurality of sub-apertures transmitting the light of the colors.

5. The directional backlight of claim 4, wherein sizes of the sub-apertures increase in the directions in which the light of the colors propagates.

6. The directional backlight of claim 1, wherein each of the grating units comprises a plurality of sub-grating units, wherein the sub-grating units are dependent on different wavelength bands of light, the aperture adjusting layer comprises aperture units corresponding to the grating units, and each of the aperture units comprises a plurality of sub-apertures respectively corresponding to the sub-grating units.

7. The directional backlight of claim 6, wherein the sub-apertures have different size ratios in different aperture units.

8. The directional backlight of claim 6, wherein the aperture adjusting layer is divided into a plurality of sections, and the sub-apertures of the aperture units have different size ratios in different sections.

9. A directional backlight comprising:
    a light source emitting light of a plurality of colors;
    a light guide plate comprising an entrance surface receiving the light emitted from the light source, the light guide plate guiding the light emitted from the light source; and
    a diffractive device comprising a plurality of grating units configured to adjust a direction of the light of the colors when the light exits the light guide plate,
    wherein each of the grating units comprises a plurality of sub-grating units corresponding to the light of the colors, and the sub-grating units have different refractive indexes such that output efficiency of the light of the colors increases in a direction away from the entrance surface of the light guide plate.

10. The directional backlight of claim 9, wherein the diffractive device is divided into a plurality of sections, and refractive indexes of sub-grating units of grating units included in a section relatively distant from the entrance surface of the light guide plate are greater than refractive indexes of sub-grating units of grating units included in a section relatively close to the entrance surface of the light guide plate.

11. A three-dimensional (3D) image display apparatus comprising:
    a directional backlight; and
    a display panel forming images using light output from the directional backlight,
    wherein the directional backlight comprises:
        a light source;
        a light guide plate comprising an entrance surface receiving light emitted from the light source, the light guide plate guiding the light emitted from the light source;
        a diffractive device comprising a plurality of grating units configured to adjust a direction of light exiting the light guide plate; and
        an aperture adjusting layer arranged on the diffractive device and comprising a plurality of apertures having different sizes.

12. A method of manufacturing a directional backlight, the method comprising:
    forming grating units, each grating unit comprising a plurality of sub-grating units on a substrate, the sub-grating units comprising different diffraction patterns;
    preparing a mask comprising an aperture array corresponding to the sub-grating units; and
    etching the sub-grating units formed on the substrate using the mask such that the sub-grating units have different sizes.

13. The method of claim 12, wherein the mask comprises mask aperture units corresponding to the grating units, and the mask aperture units comprise mask sub-apertures respectively corresponding to the sub-grating units.

14. The method of claim 12, wherein the diffraction patterns have nano-sizes, and the aperture array has a micro-size.

15. The method of claim 12, further comprising attaching a light guide plate to the substrate.

16. A method of manufacturing a directional backlight, the method comprising:
   printing a first material pattern having a first refractive index on a substrate by an inkjet printing method;
   printing a second material pattern having a second refractive index on the substrate by an inkjet printing method; and
   forming diffraction patterns on the first and second material patterns by a nanoimprinting method.

17. The method of claim 16, further comprising printing a third material pattern having a third refractive index on the substrate by an inkjet printing method.

18. The method of claim 16, further comprising attaching a light guide plate to the substrate.

19. The method of claim 18, wherein the first and second material patterns are configured to adjust output efficiency of light guided via the light guide plate.

20. The method of claim 19, wherein the first and second material patterns are configured such that output efficiency of light guided via the light guide plate increases in a direction away from an entrance surface of the light guide plate.

21. The method of claim 16, wherein the first and second material patterns comprise a plurality of grating units, and each of the grating units comprises a plurality of sub-grating units selectively diffracting light of different colors.

22. A directional backlight comprising:
   a first light source emitting light in a first direction;
   a second light source emitting light in a second direction;
   a light guide plate comprising a first entrance surface receiving light emitted from the first light source and a second entrance surface receiving light emitted from the second light source; and
   a diffractive device provided on a surface of the light guide plate that is orthogonal to the first entrance surface and the second entrance surface, the diffractive device comprising a plurality of grating units configured to adjust a direction of light exiting the light guide plate,
   wherein the grating units are configured such that a grating unit relatively far away from the first entrance surface emits more light from the first light source than a grating unit relatively closer to the first entrance surface, and such that a grating unit relatively far away from the second entrance surface emits more light from the second light source than a grating unit relatively closer to the second entrance surface.

23. The directional backlight of claim 22, wherein each grating unit comprises a plurality of sub-grating units, one sub-grating unit of the sub-grating units for light from the first light source, and another sub-grating unit of the sub-grating units for light from the second light source.

24. The directional backlight of claim 22, further comprising an aperture adjusting layer arranged on the diffractive device and comprising a plurality of apertures.

25. The directional backlight of claim 23, further comprising an aperture adjusting layer arranged on the diffractive device and comprising a plurality of apertures, the apertures respectively corresponding to the sub-grating units.

26. The directional backlight of claim 25, wherein sizes of a portion of the apertures gradually increase as a distance from the first entrance surface increases, and sizes of a portion of the apertures gradually increase as a distance from the second entrance surface increases.

* * * * *